US006936178B2

(12) United States Patent
Peloquin et al.

(10) Patent No.: US 6,936,178 B2
(45) Date of Patent: Aug. 30, 2005

(54) APPARATUS FOR AND METHOD OF SETTLING OF MINERAL SLURRIES

(75) Inventors: Guy Peloquin, Jonquiere (CA); Guy Simard, Chicoutimi (CA); Alain Boivin, La Baie (CA); Renald Dufour, Jonquiere (CA); Rock Lemyre, Chicoutimi (CA); Andrew Carruthers, Beaconsfield (CA)

(73) Assignee: Alcan International Limited, Montreal (CA)

( * ) Notice: Subject to any disclaimer, the term of this patent is extended or adjusted under 35 U.S.C. 154(b) by 197 days.

(21) Appl. No.: 10/289,789

(22) Filed: Nov. 7, 2002

(65) Prior Publication Data

US 2003/0106860 A1 Jun. 12, 2003

Related U.S. Application Data

(60) Provisional application No. 60/345,867, filed on Nov. 9, 2001.

(51) Int. Cl.[7] .................................................. C02F 1/52
(52) U.S. Cl. ........................ 210/738; 210/800; 210/519
(58) Field of Search ................................ 210/702, 738, 210/800, 803, 804, 512.1, 512.2, 519

(56) References Cited

U.S. PATENT DOCUMENTS

| | | | | |
|---|---|---|---|---|
| 3,891,557 | A | 6/1975 | Edgerton | 210/519 |
| 3,926,805 | A | 12/1975 | Walker | 210/101 |
| 4,054,514 | A * | 10/1977 | Oltmann | 210/715 |
| 4,127,488 | A | 11/1978 | Bell et al. | 210/519 |
| 4,278,541 | A | 7/1981 | Eis et al. | 210/112 |
| 4,390,429 | A | 6/1983 | Lejeune et al. | 210/519 |
| 4,647,372 | A | 3/1987 | Condolios | 210/207 |
| 4,830,507 | A | 5/1989 | Bagatto et al. | 366/132 |
| 4,999,115 | A * | 3/1991 | Peterson | 210/728 |
| 5,015,392 | A | 5/1991 | Taylor | 210/712 |
| 5,076,915 | A | 12/1991 | Rose | 210/197 |
| 5,389,250 | A | 2/1995 | Wood et al. | 210/194 |

FOREIGN PATENT DOCUMENTS

| | | |
|---|---|---|
| DE | 32 15 033 A1 | 11/1983 |
| EP | 0 052 864 A1 | 6/1982 |
| GB | 749736 | 5/1956 |
| WO | WO 01/10530 | 2/2001 |
| WO | WO 01/19489 | 3/2001 |

* cited by examiner

Primary Examiner—Robert A. Hopkins
(74) Attorney, Agent, or Firm—Cooper & Dunham LLP

(57) ABSTRACT

The invention relates to a settler for decanting mineral slurries and a method thereof. The settler comprises a tank for holding and decanting a body of slurry to form a thickened slurry as a lower layer and a clarified liquid as an upper layer, the tank having a side wall, a bottom and a top, an outlet for the thickened slurry at the bottom of the tank, an outlet for the clarified liquid layer near the top of the tank, a slurry inlet means near the top of the tank for introducing fresh slurry into the tank, the slurry inlet means having a slurry opening through which fresh slurry joins the body of slurry in the tank, and a stirrer having a generally vertical axis around which the stirrer rotates or reciprocates. The slurry opening is displaced laterally relative to the generally vertical axis of the stirrer and the slurry inlet means is configured to allow the fresh slurry to enter the slurry body without accumulating solids from the fresh slurry at the slurry opening.

24 Claims, 2 Drawing Sheets

APPARATUS FOR AND METHOD OF SETTLING OF MINERAL SLURRIES

CROSS-REFERENCE TO RELATED APPLICATION

This application claims the priority right of prior U.S. patent application Ser. No. 60/345,867 filed on Nov. 9, 2001 by applicants herein.

BACKGROUND OF THE INVENTION

1. Field of the Invention

This invention relates to settlers for mineral slurries (sometimes referred to as gravity settlers, pressure settlers, clarifiers, separators, thickeners, deep thickeners, and the like) used in industrial processes. More particularly, the invention relates to settlers used for decanting or thickening slurries of minerals or mineral tailings, for example red mud produced during the extraction of alumina from bauxite by the Bayer alkaline digestion process.

2. Background Art

Many industrial processes make use of tanks or reservoirs in which slurries of mineral materials or tailings are allowed to settle and densify, often with the assistance of flocculants or other chemical aids, to produce a thickened lower slurry layer and a clarified or liquid upper layer. The thickening process may be required for various reasons, but is often used to produce a thick mud or plastic solid that may be disposed of or transported more easily and economically than a thin slurry. The clarified liquid may then be re-circulated to the same industrial process or disposed of directly.

An example of a settler of this kind is disclosed in U.S. Pat. No. 4,830,507 which issued to the same assignee as the present application on May 16, 1989. The apparatus consists of a large open-topped tank having an outlet for thickened slurry at the center of the bottom wall and an outlet for clarified liquid in a side wall of the tank near the open top. Slurry to be decanted is introduced into the tank via a feed well positioned at the center of the tank near the top. The feed well is an upright cylinder consisting of a cylindrical side wall having an open upper end and a lower end that is partially closed by an annular inward projection or lip from the lower end of the side wall. The inward projection terminates short of the center of the feed well, leaving a circular opening at the center. The feed well is partially submerged beneath the upper surface of the slurry in the tank and fresh slurry is fed into the inside of the feed well below the slurry surface tangentially along the cylindrical inner wall, creating a circular flow of slurry within the feed well. A flocculant or other chemical may be added to the feed well for mixture with the slurry so that flocs may form and grow in a single location, and the flocculated slurry mixture then descends through the central opening at the bottom of the feed well into the body of the tank where settling takes place. The settling process is assisted by an upright rotating stirrer in the form of a rake or the like arranged centrally in the tank.

Settlers of this kind work well for slurries made up of relatively fine suspended particles that do not differ greatly in diameter throughout the slurry. For example, red mud from the Bayer process usually has a particle size in the range of up to 10 microns. However, it has been found that when slurries contain coarse particles, in addition to fine particles, problems can arise. For example, some slurries may contain sand or other coarse particles in addition to mud particles. Particles of sand may have diameters of more than 75 microns, and often more than 100 or even 400 microns (in fact, sand particles may even be in the 1000 to 2000 micron size range). When such slurries are decanted in conventional apparatus of the above kind, deposits of solids made up of segregated size fraction materials and more specifically of coarse particles may form in the settler tank, especially around the central lower outlet and the stirrer. Such deposits may eventually cause blockages and/or cause the stirrer to stop or may even damage the stirrer due to the application of excessive torque, and this requires a premature shut-down of the apparatus for cleaning or repair. Obviously, this causes disruption of the industrial process and delay.

There is therefore a need for improvement of settlers used for decanting slurries, particularly for slurries containing a large proportion of coarse particles.

SUMMARY OF THE INVENTION

An object of the present invention, at least in a preferred form thereof, is to improve gravity settler design, particularly to accommodate slurries containing coarse particles.

Another object of the invention, at least in a preferred form thereof, is to provide a method of decanting mineral slurries containing both fine and coarse particles while minimizing problems caused by unwanted solid deposits.

Another object of the invention, at least in a preferred form thereof, is to provide a way of delaying or eliminating the formation of harmful solid deposits in settlers used for decanting mineral slurries.

According to one aspect of the invention, there is provided a settler for decanting mineral slurries, comprising a tank for holding and decanting a body of slurry to form a thickened slurry as a lower layer and a clarified liquid as an upper layer, the tank having a side wall, a bottom and a top, an outlet for the thickened slurry at the bottom of the tank, an outlet for the clarified liquid layer near the top of the tank, a slurry inlet means near the top of the tank for introducing fresh slurry into the tank, the slurry inlet means having a slurry opening through which fresh slurry joins the body of slurry in the tank, and a stirrer having a generally vertical axis around which the stirrer rotates or reciprocates, wherein said slurry opening is displaced laterally relative to said generally vertical axis of the stirrer and said slurry inlet means is configured to allow said fresh slurry to enter said slurry body without accumulating solids from the fresh slurry at the slurry inlet.

According to another aspect of the invention there is provided a method of decanting a mineral slurry, preferably containing both coarse and fine particles, which comprises introducing fresh slurry into a body of slurry in a tank having a stirrer rotating or reciprocating about a generally vertical axis to form a thickened slurry as a lower layer and a clarified liquid as an upper layer, removing thickened slurry from an outlet at a bottom of the tank, and removing clarified liquid adjacent to a top of the tank, wherein the fresh slurry is introduced into the tank through a slurry inlet means having an opening spaced laterally from the vertical axis of the stirrer without causing substantial quantities of solids to accumulate from the fresh slurry at the slurry inlet.

In the above method, the accumulation of solids from the fresh slurry immediately upstream of the opening in the slurry inlet means may be avoided by maintaining a suitably high rate of flow of fresh slurry throughout the entire slurry inlet means and the slurry opening to prevent settling of solids. In the apparatus, this can be achieved by ensuring that the slurry opening is the same size (area) as the cross-section of the slurry inlet means immediately upstream of the slurry opening, or is not significantly smaller.

By the term "displaced laterally" we mean that the vertical axis of the stirrer (or an upward extension thereof) does not pass through the slurry opening as the opening is displaced horizontally sideways relative to the axis. The slurry opening normally opens substantially downwardly, thus facing the bottom of the tank.

The vertical axis of the stirrer is preferably aligned concentrically with the outlet for the thickened slurry, with both the axis and the outlet being in the center of the tank. The slurry opening then preferably has a center positioned at a distance from the center of the tank by at least 5%, and more preferably at least 10%, of the distance between the center and the side wall of the tank. In fact, the slurry opening may be positioned 50% or more of the distance between the center of the tank and the side wall, and indeed may be positioned immediately adjacent to the side wall of the tank.

The stirrer is preferably in the form of a rake having a rotatable or reciprocable central vertical rod aligned with the vertical axis. The central vertical rod preferably supports a number of radially-projecting arms or tines for cutting through the layer of thickened slurry to assist with de-watering of the slurry. The arms, upon rotation, create a stirred volume of the material being treated and the opening of the slurry inlet means may be positioned either completely above the stirred volume or extending partially (or even fully) laterally beyond the stirred volume.

The slurry inlet means is preferably in the form of a vertically oriented feed well provided with a slurry opening at the bottom of the feed well creating a slurry flow into the body of slurry in the tank. The feed well has a cross-sectional area transversely of the slurry flow immediately upstream of the slurry opening, and ideally the slurry opening has a cross-sectional area that is at least 80% as large as the cross-sectional area of the feed well immediately upstream of the slurry opening. This avoids or prevents substantial accumulation of solids from the fresh slurry in the feed well immediately upstream of the slurry opening as the fresh slurry does not become unduly quiescent within the feed well. Other forms of slurry inlet means may be employed, including a simple inlet pipe terminating in a delivery hole for introducing fresh slurry into the tank. In general, the slurry inlet means are preferably of such a design that a generally cylindrical column or "plume" of fresh flocculating slurry is introduced into the slurry body in the tank.

The settler of the invention may be provided with more than one slurry inlet means, all of which have slurry openings displaced laterally relative to the vertical axis of the stirrer.

The tank of the settler preferably has a bottom wall and the outlet for the thickened slurry is preferably positioned in the bottom wall of the tank. The bottom wall may be in the form of an inverted cone extending downwardly from the side wall to the outlet for the thickened slurry. The cone ideally has an angle in the range of 5 to 60°.

The vertical shaft of the stirrer is preferably aligned vertically with the outlet for the thickened slurry, in which case the slurry opening is also necessarily displaced laterally relative to the outlet for the thickened slurry.

The present invention may be applied to gravity settlers as well as to pressure gravity settler vessels such as the one disclosed in U.S. Pat. No. 5,407,561.

DETAILED DESCRIPTION OF THE INVENTION

Figure 1:
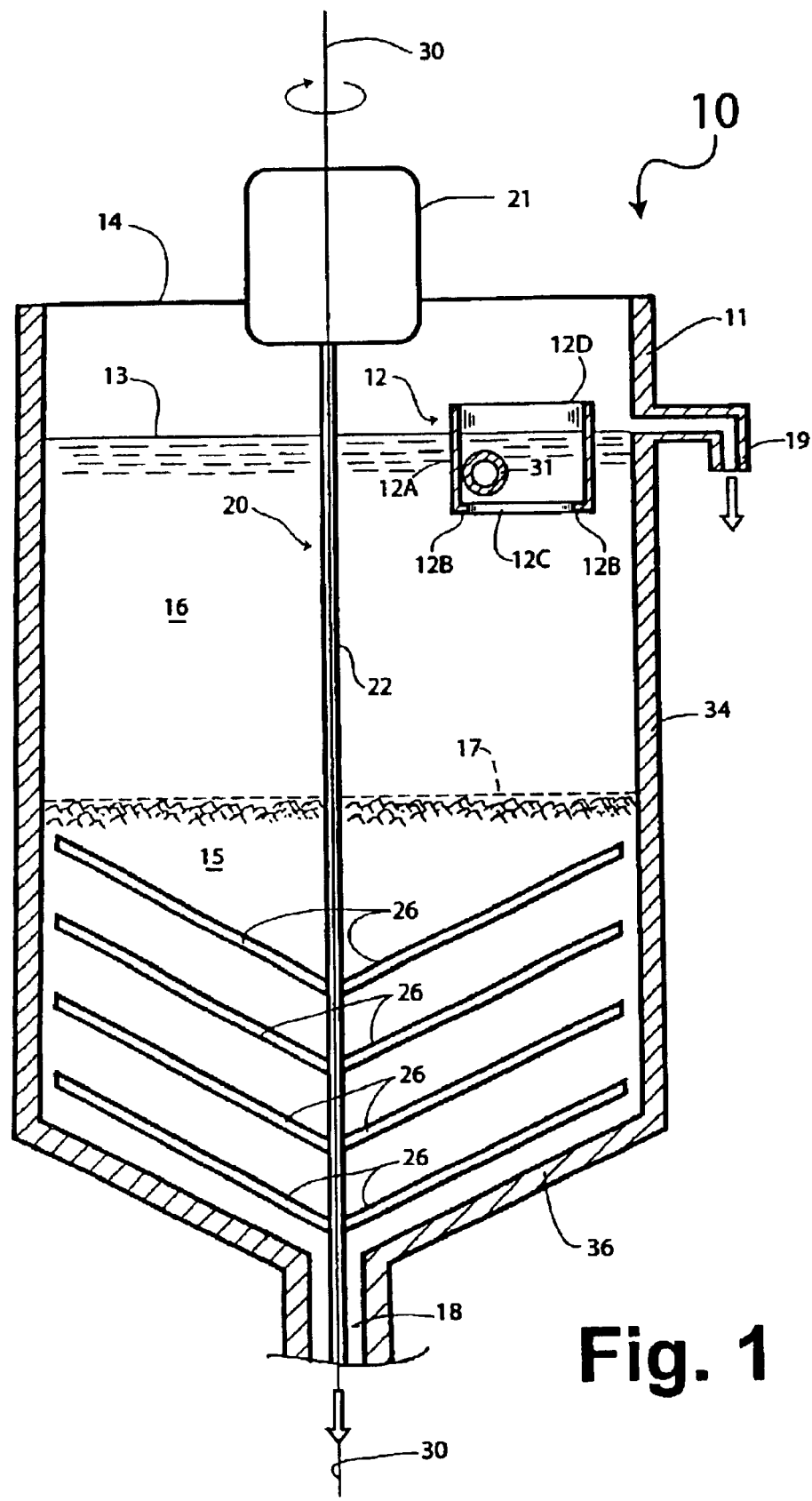
FIG. 1 is vertical cross-section of a gravity settler showing one preferred example of the present invention.

A vertical cross-section of a gravity settler 10 according to one preferred embodiment of the present invention is shown in FIG. 1 of the accompanying drawings. The description of this embodiment refers to the treatment of red mud as an example, but apparatus according to the present invention may also be used with other mineral slurries, including those that do not contain coarse particles.

Red mud slurry, washing liquor and flocculent are introduced into a tank 11, which acts as a gravity settler, through a feed well 12 acting as a slurry inlet means for the settler. The slurry collects within the tank to an upper surface 13 near the top 14 of the tank. The mud flocs settle to form a lower layer of thickened mud 15 and an upper layer of clarified liquor 16 separated by a mud/liquor interface 17. The thickened mud is withdrawn from a lower or underflow outlet 18 and the clarified liquor overflows at an upper outlet 19. A central stirrer in the form of a rotating rake 20 operated by a motor 21 is provided in the tank. The rake consists of an upright central vertical shaft 22 having a number of upwardly-angled, radially-extending arms 26 forming tines rigidly attached to the central shaft. As it rotates around a central vertical axis 30, the rake 20 forms channels in the flocculated solids (active mud) which allow egress of water to the surface and thus facilitate densification of the mud.

The feed well 12, which is partially submerged in the slurry in the tank 11, has an upright cylindrical wall 12A, an inwardly-directed bottom lip 12B defining a central hole 12C, and an open top 12D. An inlet means pipe 31 introduces fresh slurry into the feed well as a tangential flow that causes the slurry to swirl around the inside of the feed well and then to exit the central hole 12C. This minimizes currents in the tank and allows mixing of slurry and flocculent and the like in the feed well before the slurry enters the tank.

Conventionally, feed wells in this kind of apparatus are positioned exactly at the center of the tank immediately above (or usually surrounding) the stirrer and directly above the outlet 18 for thickened slurry as shown, for example, in our prior U.S. Pat. No. 4,830,507. The inventors of the present invention have now found that it is unexpectedly advantageous to position the feed well 12 off-center relative to the stirrer, i.e., in the illustrated embodiment, at a position anywhere between the central vertical axis 30 of the stirrer 20 and side wall 34 of the tank 11. The feed well is thus laterally displaced relative to the central vertical axis 30 and the rake shaft 22 (i.e. it is not positioned in the immediate vicinity of the central rake shaft). The advantage thereby obtained is that, particularly when the equipment is used for decanting red mud having a high content of sand or other coarse particles, this arrangement reduces the tendency of the coarse particles to accumulate around the bottom of the stirrer 20 in the region of the underflow outlet 18. There may also be advantages to this arrangement even when the slurry does not contain coarse particles.

Of course, the important consideration is not so much that the feed well 12 or other slurry inlet means may be positioned off-center of the tank, but that it be positioned laterally of the central vertical axis 30 of the rake. The shaft 22 of the rake, which coincides with the central vertical axis 30, is normally centered in the tank, but need not be in this position. Furthermore, while the rake is normally concentric with the underflow outlet as shown, it may be positioned to one side of the outlet, in which case the feed well is preferably laterally displaced both from the underflow outlet 18 as well as the central vertical axis 30 of the rake.

The reason for the unexpected advantage is not precisely known. However, without wishing to be limited to any particular theory, it is speculated that the coarse particles exiting the central hole 12C of the feed well 12 may descend primarily vertically and quite quickly. Consequently, since the central hole 12C of the feed well is positioned laterally with respect to the underflow outlet 18 and the central vertical shaft of the stirrer, the descending particles are contacted by the arms 26 of the stirrer at a distance from the center of the stirrer. At the center of the stirrer immediately around the shaft 22, there is very little disturbance of the slurry because the arms 26 are moving quite slowly (in terms of actual distance traveled per unit time) and there is little force. At a greater distance from the center of the stirrer, the sections of the arms 26 are moving more quickly and the force that such arms can apply to the surrounding slurry is greater. Therefore, there is more likelihood that coarse particles in the slurry adjacent to the arms in these locations will be swept up, separated from each other and mixed with the surrounding thickened body of fine slurry particles, so that they can eventually be swept away through the underflow outlet 18 with less of an opportunity to agglomerate together and become cemented into a solid mass.

In general, the feed well 12 or other slurry inlet means should preferably be positioned so that the slurry opening 12C of the feed well is displaced laterally from the vertical axis 30 of the stirrer to such an extent that there is no overlapping area of the opening 12C and the vertical shaft 22 of the rake. Preferably, when the stirrer is centrally located, the center of the slurry opening 12C is displaced laterally from the central tank axis by a distance of at least 5%, and more preferably at least 10%, of the length of the radius of the tank (the distance between the central tank axis and tank wall 34).

The bottom wall 36 of the tank is preferably in the form of an inverted cone leading to underflow outlet 18 as shown. The angle of the cone (the slope of the bottom wall relative to the horizontal) is preferably in the range of 5 to 60°. However, the bottom wall may be completely flat, if desired. Moreover, while the underflow outlet 18 is shown as a hole in the bottom wall 36, the underflow outlet may alternatively be an upwardly facing opening in a pipe extending into the tank from the bottom wall or a side wall. In settlers of this kind, the densified mud tends to form an inactive body around the actively raked volume of mud, and thus tends to form an inner shell defining a shape leading to the underflow outlet and corresponding to the volume swept by the rake. The effective shape of the inside of the tank 11 is therefore defined by the shape and extent of the rake, rather than by the shape and dimensions of the tank itself. Virtually any shape or configuration of tank interior may therefore be employed.

While the illustrated embodiment has a feed well 12 as a slurry inlet means, this is not essential. The slurry may be introduced directly into the body of slurry in the tank directly through an open-ended pipe or the like. If a flocculent is employed, it may be introduced into the pipe upstream of the open end so that mixing takes place before the slurry enters the settler. Whatever arrangement is used for the slurry inlet means, there should most preferably be no opportunity provided within the vicinity of the slurry inlet means for settling and accumulation of the solids from the fresh slurry. There should therefore most preferably be no holding or mixing tank or distributor or manifold or weir of the kind that allows solids in the slurry to settle on a surface before the slurry enters the body of the tank, and there should be no surfaces on which the particles may accumulate. As noted and as already illustrated, a feed well 12 may have a lower end that is either completely open, or that has an inwardly projecting lip 12B. The feed well may cause the slurry flow from the pipe 31 to slow, but the lip (if present at all) is too narrow to permit the accumulation of solids to an undesirable extent. Most preferably, the open area of the slurry opening of the feed well should amount to 75 to 100%, and more preferably at least 80%, of the total area defined by the side wall of the feed well immediately adjacent to and upstream of the central opening 12C. This preferred ratio of open area to maximum possible feed area at a slurry outlet applies to any kind inlet means device used for introduction of the slurry into the settler tank to avoid coarse particle accumulation.

While it is advantageous to position the slurry inlet means vertically above a part of the volume within the settler swept by the arms 26 of the rake as the rake rotates or reciprocates (other than above the central vertical shaft 22) so that the descending coarse particles may be acted upon by the rake and mixed with the thickened mud, it has unexpectedly been found that a particularly advantageous form of the invention may be obtained if the slurry inlet means is positioned close to the inner wall of the settler tank. In this connection, it will be appreciated that the arms of the stirrer may not in all cases extend completely to the inner walls of the settler tank. Such an arrangement produces a descending column of flocculating solids adjacent to the inner wall of the tank 11.

By locating the feed well away from the center of the tank, the possibility arises of providing more than one feed well for a more even and rapid distribution of the slurry into the tank. Each such feed well should preferably be positioned at a lateral distance from the center of the stirrer (and the center of the tank) and may be positioned at the side wall of the tank. Two, three, four or more such feed wells may therefore be provided in a symmetrical arrangement around the center line of the tank.

Figure 2:
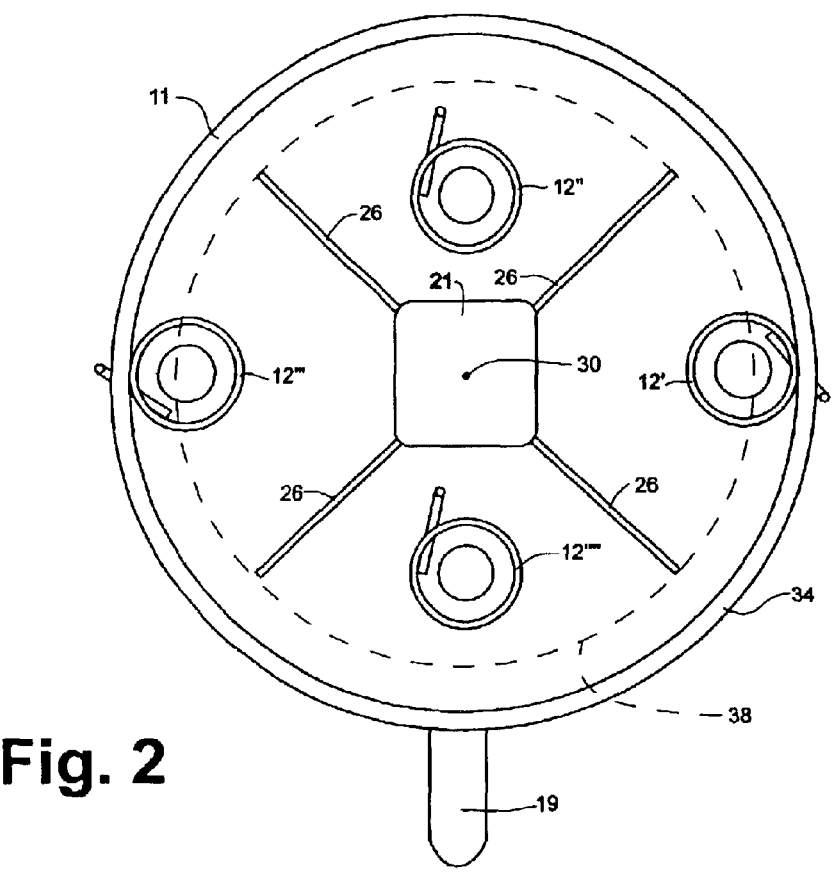
FIG. 2 is a top plan view of a gravity settler similar to that of FIG. 1 but equipped with a plurality of off-center feed wells for the slurry.

FIG. 2 of the accompanying drawings is a plan view of a further preferred embodiment of a settler according to the present invention showing the use of four feed wells 12', 12", 12''' and 12'''' for the introduction of slurry into the tank. Two of the feed wells 12" and 12'''' are positioned between the central axis 30 of the stirrer and the tank wall 34, and the other two 12' and 12''' are positioned immediately adjacent to the inner wall of the tank (actually touching the inner tank wall 34). The arms 26 of the stirrer sweep an volume bounded by the dotted circle 38. It will be seen that feed wells 12" and 12'''' are positioned well within the boundary of circle 38, whereas feed wells 12' and 12''' are positioned partly outside the circle 38. The invention is found to be effective for feed wells in both such positions, and in fact the feed wells located at the tank wall may be more effective at preventing coarse particle build-up even if they are not within the area swept by the rake.

While the apparatus of the invention may be used with slurries that do not contain coarse particles, there may be advantage in having the feature of this invention even when handling a slurry containing almost no coarse particles. The apparatus of the invention is particularly intended for slurries containing particles generally of two size distributions, i.e. fine particles and coarse particles. As noted earlier, the fine particles generally have diameters in the range of 0 to 10 microns, and the coarse particles generally have diameters in the size range of greater than 75 microns (and more usually greater than 100 microns or 400 microns or even 1000 to 2000 microns). The apparatus of the invention is particularly advantageous when used with slurries for which the coarse fraction forms at least 10% of the total slurry solids by weight (w/w), and more preferably 10 to 50% by weight. On the other hand, the conventional settler designs can often operate satisfactorily only when the percentage of coarse particles amounts to less than 5% by weight.

As noted above, red mud from the Bayer process is a material to which the present invention may be suitably applied, but it is not the only suitable material. Any mineral slurry containing coarse and fine particles (or only fine particles) may be used in the invention. The apparatus may even be used for the settling of slurries of sands produced from oil extraction from tar sands.

The invention is particularly suited for gravity settlers having a central rake of the type described above. The arrangement of the invention keeps coarse particles away from the central underflow outlet.

The invention may also be used with gravity settlers that are non-circular. In such cases there may be no center of the tank, i.e. a point that is equi-distant from the side walls. In such cases, the inlet means for the slurry should be separated in a horizontal direction from the vertical driving shaft of the rake and any area not swept by the rake arm. Moreover, if such a gravity settler has a rake rotating about a central axis and a periphery of an area swept by arms projecting from the stirrer, the slurry inlet means should be located between the central axis of the rake and the periphery of the swept area.

The invention will be illustrated in more detail with reference to the following Examples, which are provided for the purpose of illustration only.

EXAMPLES

Comparative Example 1

Red mud was obtained from the digestion of a mixture of bauxite (60% Brazilian, 20% African, 20% Australian) using a conventional Bayer process. The mud sample under test was collected from one of the last stage of mud washing circuit. The temperature of the mud was 30° C.

The settler used in this Example was of the design shown in FIG. 1 except that the tank was equipped with a central feed well arrangement. The settler tank had a volume of 1250 liters and was circular with a conical shape at the bottom (30° angle). The diameter of the circular section was 1.25 m and total height with cone was 1.6 m.

The tank was equipped with a raking mechanism turning at a rotation speed varying between 0.1 to 2 rpm and had a central bottom discharge point (underflow outlet).

The feed flow rate for the slurry was 10 liters/minutes with a solids concentration varying between 50 and 100 g/l. The feed solids contained 19% (w/w) coarse particles measured on a dry basis. The coarse particles had a median size of 450 microns with a widespread size distribution. The duration of the test was 48 hours.

Figure 3:
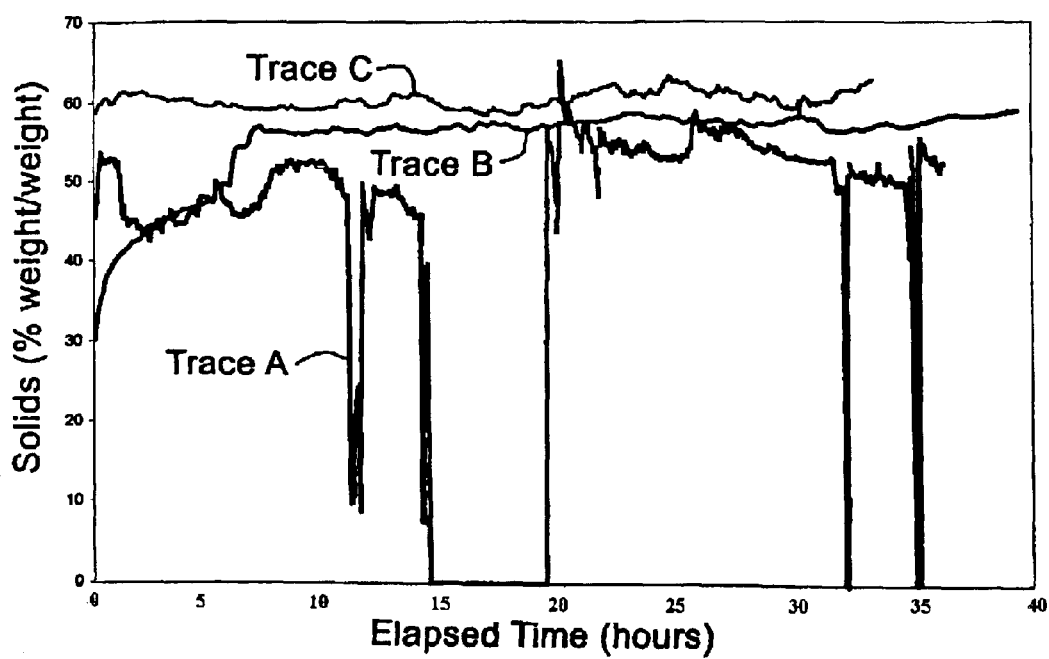
FIG. 3 is a graph of the evolution of underflow solids with time illustrating results obtained in the following Comparative Example and the Examples.

The results obtained with this central feed well showed an underflow solids concentration of 49% and a downtime of the unit of the order of 10%. The graph of FIG. 3 (trace A) gives the variation of the percentage solids with time. As can be seen, the evolution of underflow solids is inconsistent and periodically interrupted.

Example 1

All test conditions of this Example were similar to those of Comparative Example 1 above except that the feed well was located at half the radius measured from the center of the tank to the wall.

The feed solids contained 15% (w/w) coarse particles measured on a dry basis.

The results obtained with that set-up gave an underflow solids concentration of 55% and downtime of the unit of the order of 0%. The graph of FIG. 3 (trace B) gives the variation of the percentage of solids with time. The evolution of underflow solids is clearly quite even and regular.

Example 2

All the test conditions of this Example are similar to those of Comparative Example 1 above except that the feed well was again located at half the radius measured from the center of the tank to the wall.

The feed solids contained 27% (w/w) coarse particles measured on a dry basis.

The results obtained with this arrangement provided a solids concentration of 60% and downtime of the unit of the order of 0%. The graph of FIG. 3 (trace C) shows the variation of the percentage of solids with time. The evolution of underflow solids is clearly quite even and regular.

What we claim is:

1. A settler for decanting mineral slurries, comprising a tank for holding and decanting a body of slurry to form a thickened slurry as a lower layer and a clarified liquid as an upper layer, the tank having a central vertical axis, a side wall, a bottom and a top, an outlet for the thickened slurry at the bottom of the tank, an outlet for the clarified liquid layer near the top of the tank, a slurry inlet means near the top of the tank for introducing fresh slurry into the tank, the slurry inlet means having a slurry opening through which fresh slurry joins the body of slurry in the tank and being configured to avoid accumulation of solids from said fresh slurry immediately upstream of the slurry opening, an inlet for introduction of a flocculating agent into said slurry upstream of said slurry opening and a stirrer having a generally vertical axis around which the stirrer rotates or reciprocates, wherein said slurry opening has a center that is displaced laterally relative to said generally vertical axis of the stirrer by a distance of at least 5% of a distance between said central vertical axis of said tank and said side wall of said tank.

2. The settler of claim 1, wherein said slurry inlet means conveys said fresh slurry to said slurry opening as a slurry flow, and said slurry inlet means has a cross-sectional area transversely of the slurry flow immediately upstream of the slurry opening, and wherein said slurry opening has a cross-sectional area that is at least 80% as large as the cross-sectional area of the slurry inlet means immediately upstream of the slurry opening.

3. The settler of claim 1, wherein the vertical axis of the stirrer is aligned concentrically with said outlet for the thickened slurry.

4. The settler of claim 3, wherein said vertical axis of said stirrer and said outlet for the thickened slurry are positioned centrally of said tank.

5. The settler of claim 1, wherein the slurry inlet means is a feed well.

6. The settler of claim 4, wherein said slurry opening has a center positioned at a distance from said central vertical axis of said tank by at least 10% of the distance between said vertical axis and said side wall of the tank.

7. The settler of claim 1, having a plurality of said slurry inlet means, all of which have a slurry opening and all of which are positioned such that said slurry openings are displaced laterally relative to said vertical axis of said stirrer by said distance of at least 5%.

8. The settler of claim 1, wherein said stirrer has a central vertical rod aligned with said vertical axis of said stirrer.

9. The settler of claim 8, wherein said central vertical rod supports a plurality of radially-projecting arms for cutting through said layer of thickened slurry.

10. The settler of claim 9, wherein said plurality of arms, upon rotation, define a stirred volume and wherein said opening of said slurry inlet means is positioned wholly above said stirred volume.

11. The settler of claim 9, wherein said plurality of arms, upon rotation, define a stirred volume and wherein said opening of said slurry inlet means is positioned at least partially laterally beyond said stirred volume.

12. The settler of claim 1, wherein said tank has a bottom wall and said outlet for said thickened slurry is positioned in said bottom wall.

13. The settler of claim 12, wherein said bottom wall is an inverted cone extending downwardly from said side wall to said outlet for said thickened slurry.

14. The settler of claim 13, wherein said cone has an angle in the range of 5 to 60°.

15. The settler of claim 1, wherein said opening of the slurry inlet means is oriented to introduce a single, generally cylindrical column of fresh slurry in the body of slurry in the tank.

16. The settler of claim 13, where said cone has an angle in the range of 30 to 60°.

17. A settler for decanting mineral slurries, comprising a tank for holding and decanting a body of slurry to form a thickened slurry as a lower layer and a clarified liquid as an upper layer, the tank having a side wall, a bottom and a top, an outlet for the thickened slurry at the bottom of the tank, an outlet for the clarified liquid layer near the top of the tank, a slurry inlet means near the top of the tank for introducing fresh slurry into the tank, the slurry inlet means having a slurry opening through which fresh slurry joins the body of slurry in the tank and being configured to avoid accumulation of solids from said fresh slurry immediately upstream of the slurry opening, and a stirrer having a generally vertical axis around which the stirrer rotates or reciprocates, wherein said slurry opening is displaced laterally relative to said generally vertical axis of the stirrer and wherein the slurry inlet means is positioned at the side wall of the tank.

18. A method of decanting a mineral slurry, which comprises mixing fresh slurry with a flocculating agent to produce a fresh slurry mixture and introducing said fresh slurry mixture into a body of slurry in a tank having a central vertical axis and a side wall and provided with a stirrer rotating or reciprocating about a generally vertical axis to form a thickened slurry as a lower layer and a clarified liquid as an upper layer, said fresh slurry mixture being introduced at a slurry inlet means through an opening while avoiding accumulation of solids from said fresh slurry mixture immediately upstream of said opening, removing thickened slurry from an outlet at a bottom of the tank, and removing clarified liquid adjacent to a top of the tank, wherein said fresh slurry mixture is introduced into the tank through said opening at a position spaced laterally from said vertical axis of the stirrer by a distance of at least 5% of a distance between said central vertical axis of said tank and said side wall of said tank.

19. The method of claim 18, wherein said slurry introduced into said tank comprises a mixture of coarse particles of more than 75 microns in diameter and fine particles of less than 10 microns in diameter.

20. A method of decanting a mineral slurry, which comprises introducing fresh slurry into a body of slurry in a tank provided with a stirrer rotating or reciprocating about a generally vertical axis to form a thickened slurry as a lower layer and a clarified liquid as an upper layer, said fresh slurry being introduced at a slurry inlet means through an opening while avoiding accumulation of solids from said fresh slurry immediately upstream of said opening, removing thickened slurry from an outlet at a bottom of the tank, and removing clarified liquid adjacent to a top of the tank, wherein said fresh slurry is introduced into the tank through said opening at a position spaced laterally from said vertical axis of the stirrer and wherein said fresh slurry is introduced into the body of slurry in the tank at a position immediately adjacent to the side wall of the tank.

21. The method of claim 18, wherein the fresh slurry is introduced into the tank through a plurality of slurry inlet means each having an opening spaced laterally from said vertical axis of the stirrer by said distance of at least 5% of a distance between said central vertical axis of said tank and said side wall of said tank.

22. The method of claim 18, wherein the thickened slurry of the lower layer is stirred to form a stirred volume and wherein said fresh slurry mixture is introduced through said slurry opening positioned wholly above said stirred volume.

23. The method of claim 18, wherein the thickened slurry of the lower layer is stirred to form a stirred volume and wherein said fresh slurry mixture is introduced through said slurry opening positioned at least partially laterally beyond said stirred volume.

24. The method of claim 18, wherein said accumulation of solids from said fresh slurry mixture immediately upstream of said opening is avoided by maintaining a suitably high rate of flow of fresh slurry mixture throughout said slurry inlet means and said slurry opening to prevent settling of solids.

* * * * *